(No Model.) 9 Sheets—Sheet 1.
J. P. MONROE.
SELF BINDING HARVESTER.
No. 506,711. Patented Oct. 17, 1893.
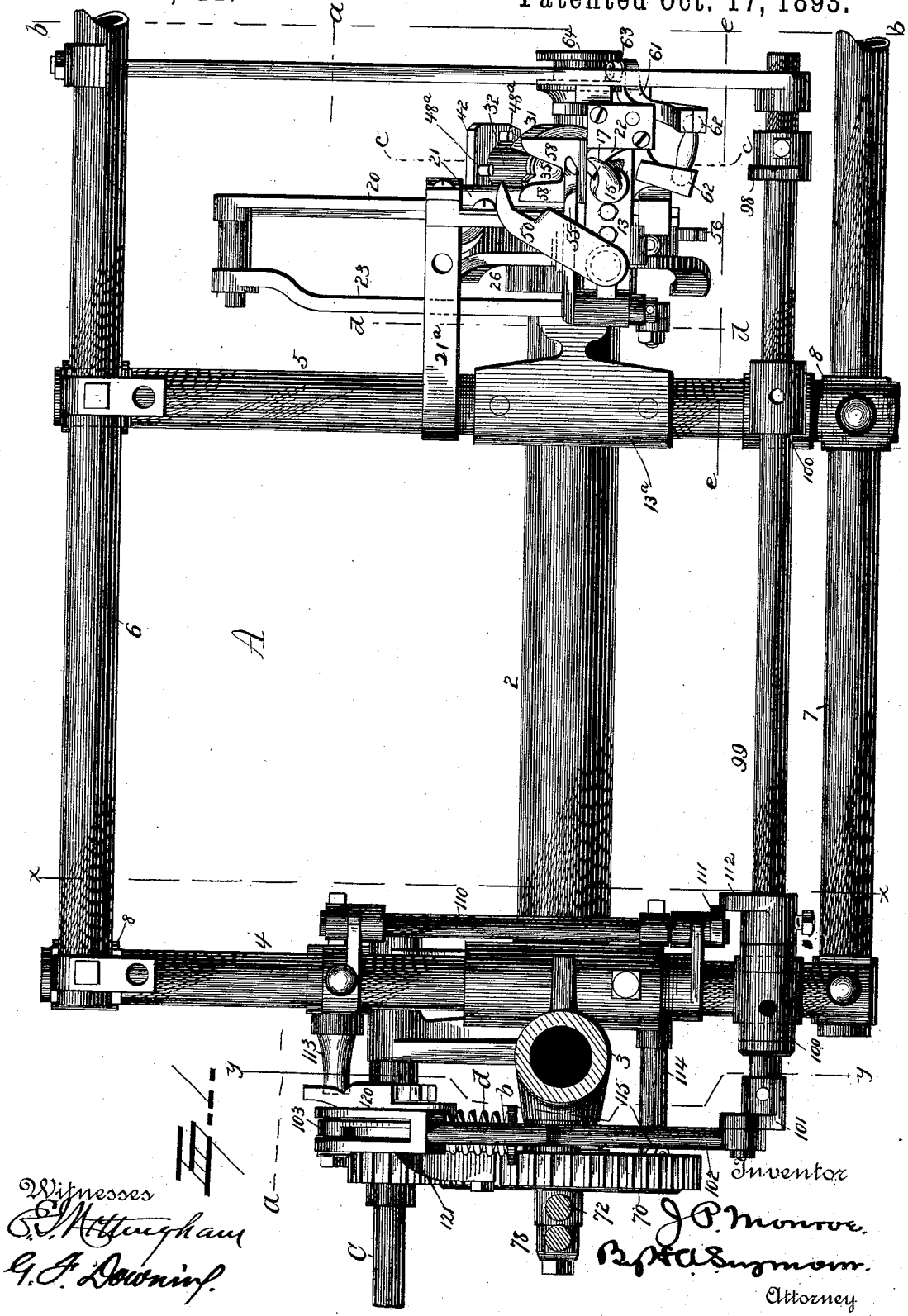
Witnesses
E. J. Attingham
G. F. Downing
Inventor
J. P. Monroe
By H. A. Seymour
Attorney (No Model.)

J. P. MONROE.
SELF BINDING HARVESTER.

No. 506,711.

9 Sheets—Sheet 2.

Patented Oct. 17, 1893.

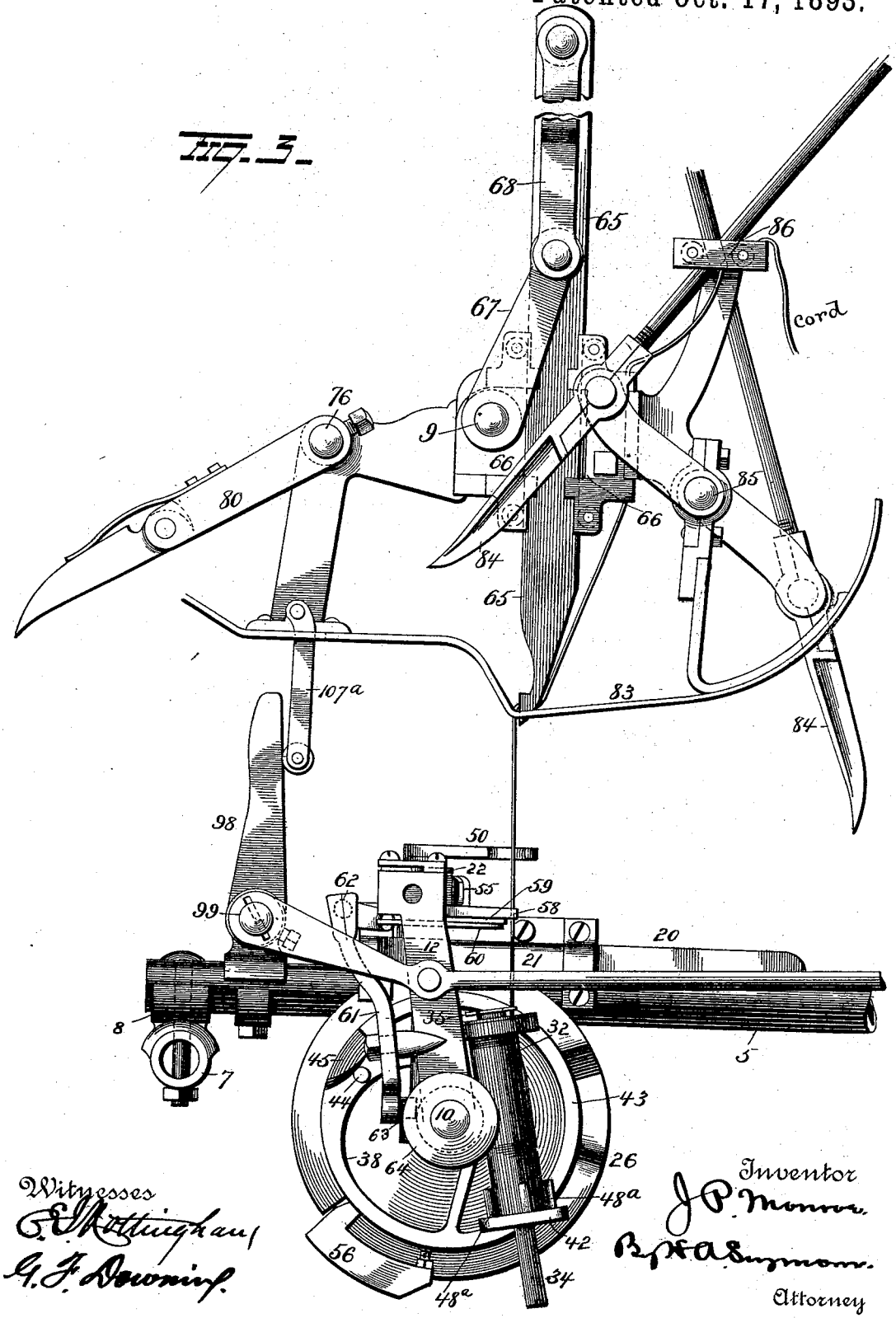

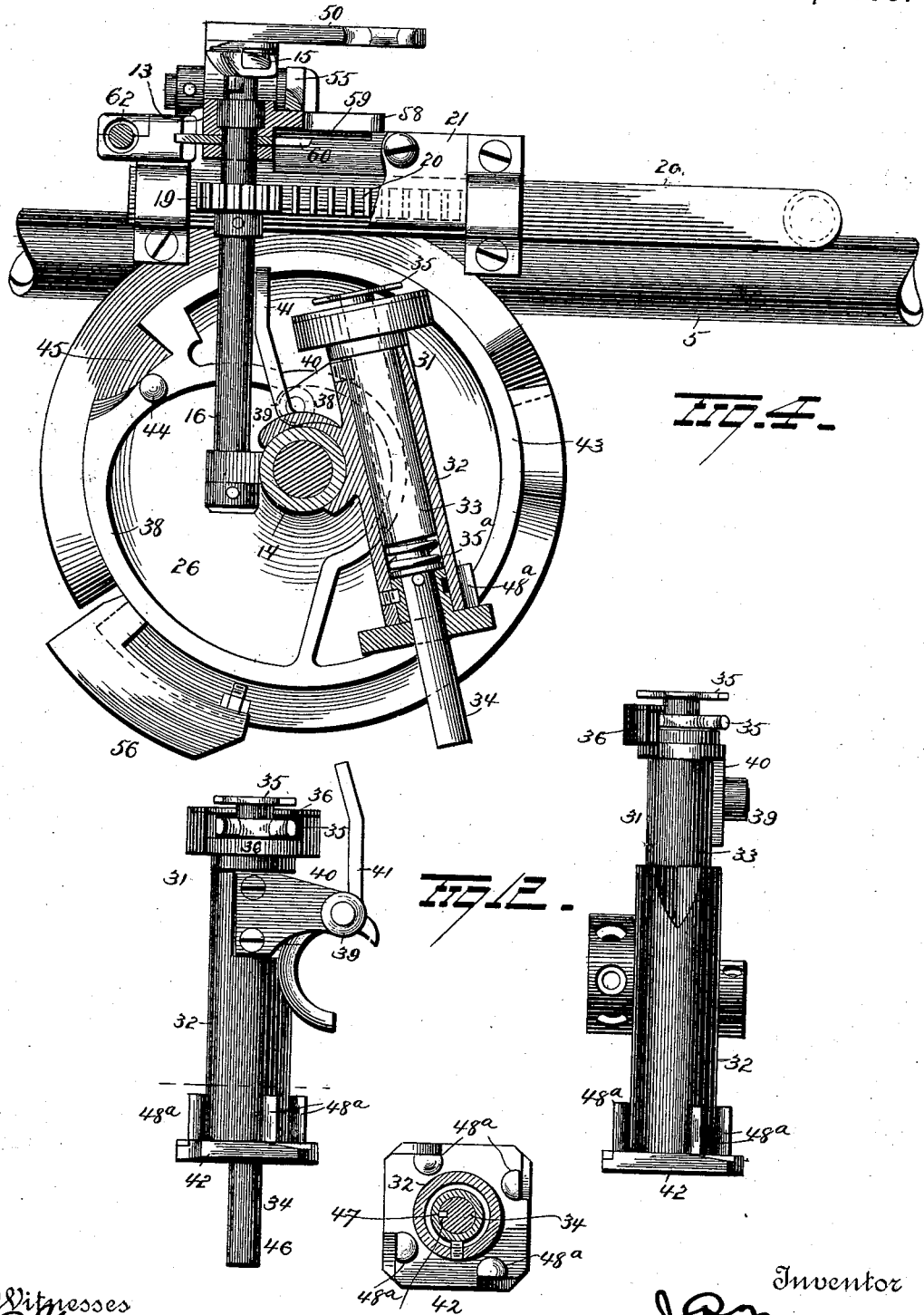

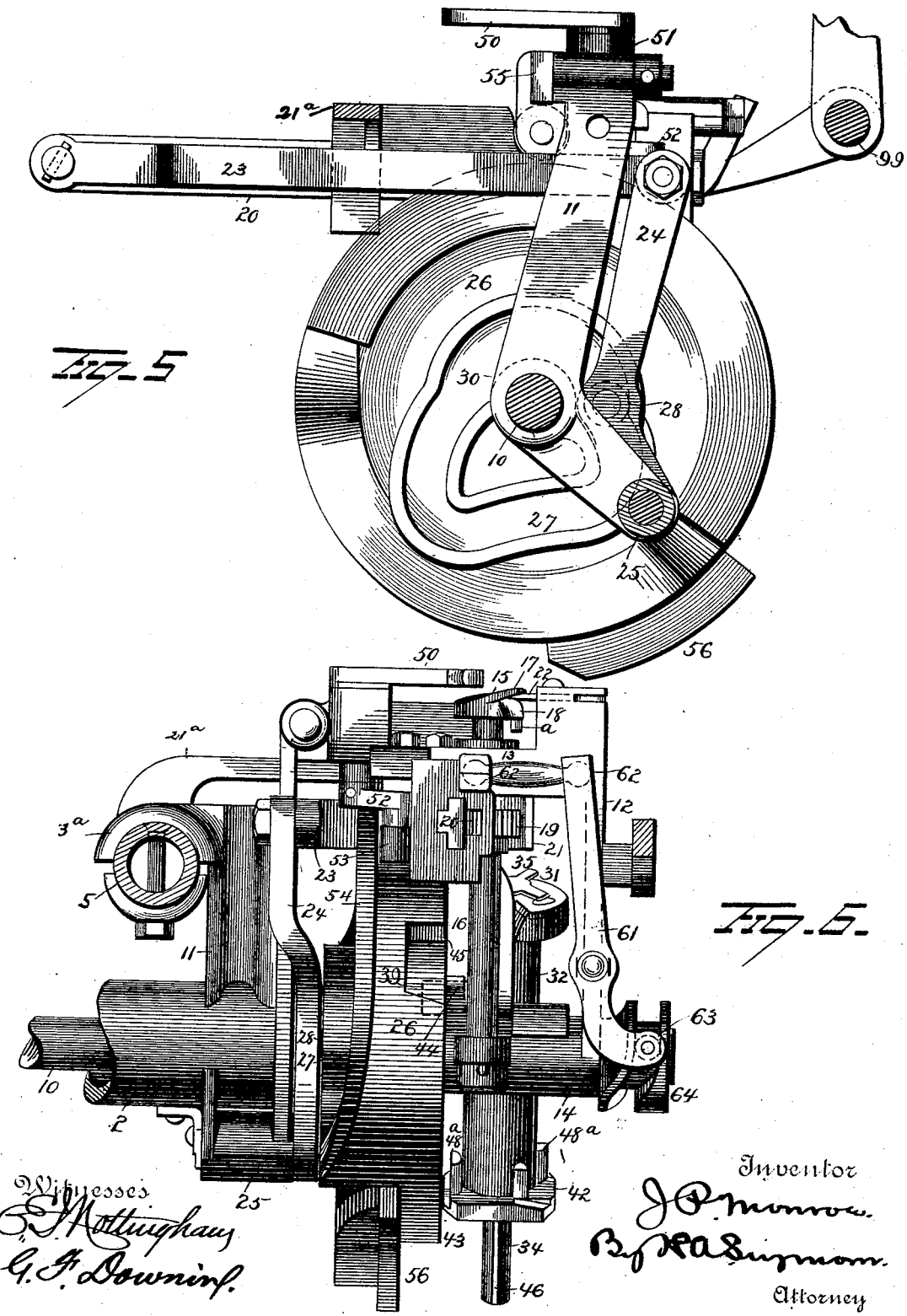

(No Model.)　　　　　　　　　　　J. P. MONROE.　　　　　9 Sheets—Sheet 6.
SELF BINDING HARVESTER.
No. 506,711.　　　　　　　　　Patented Oct. 17, 1893.
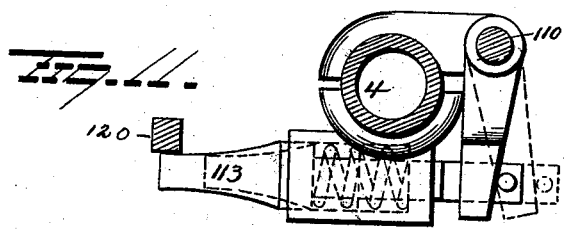
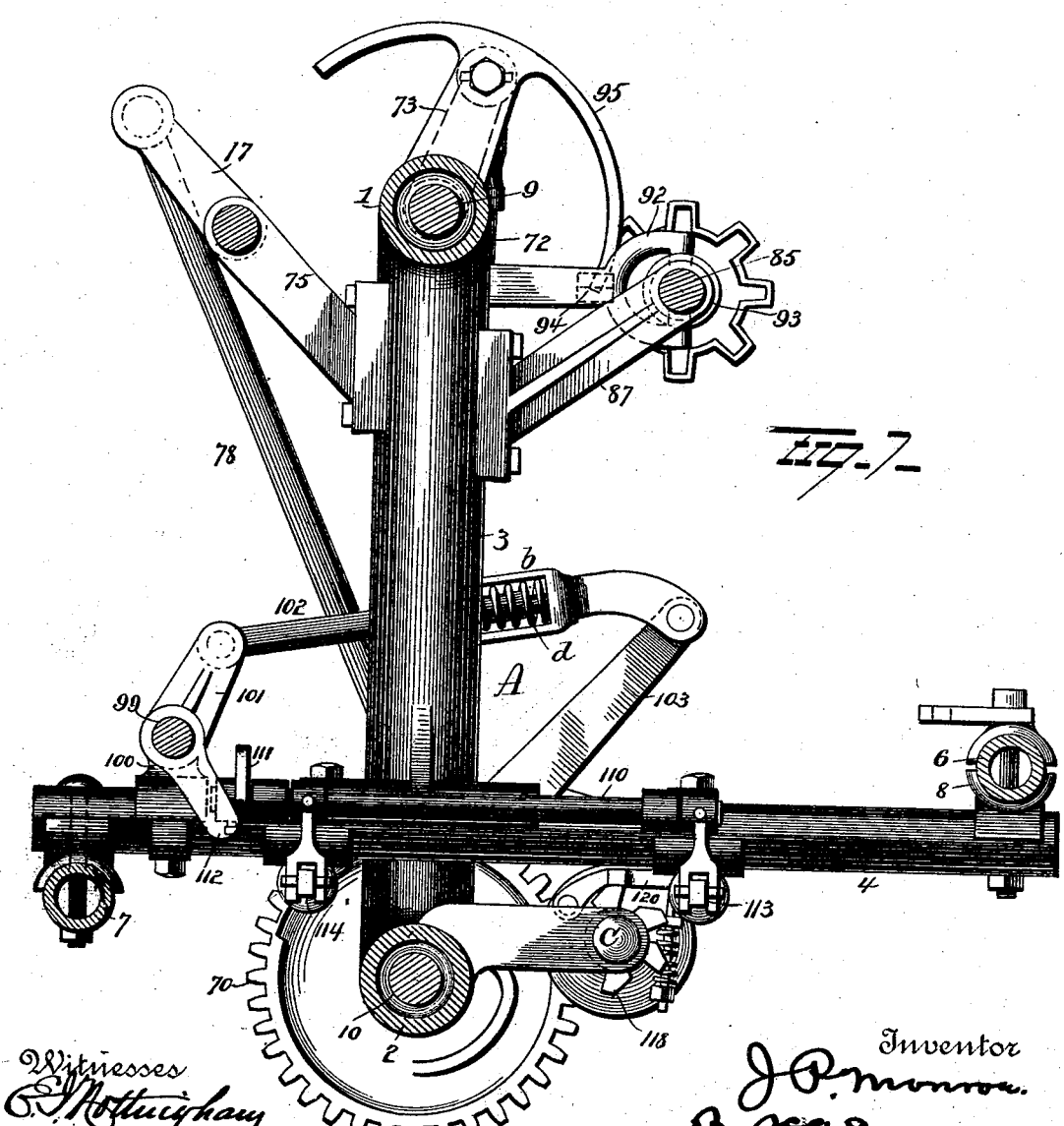

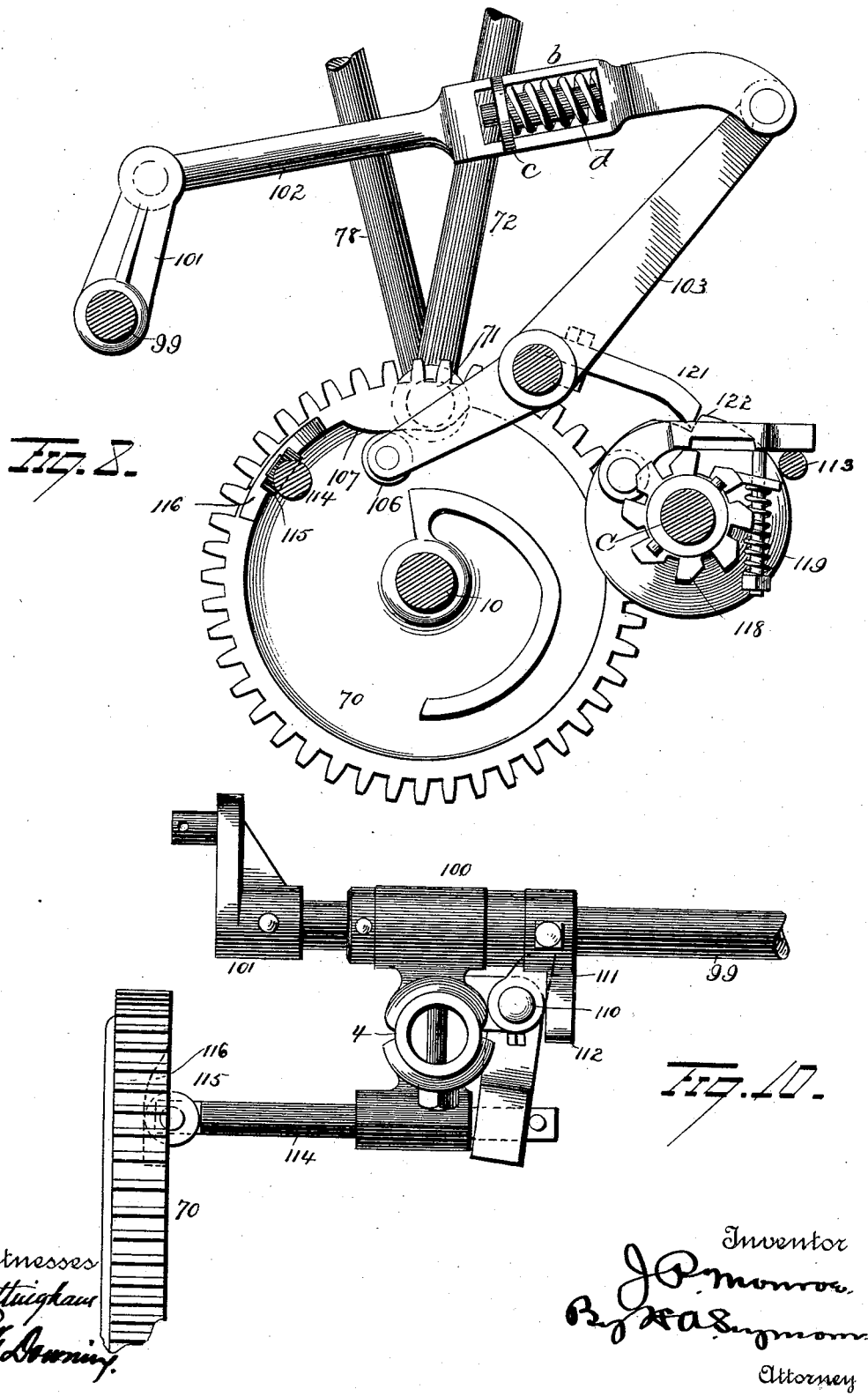

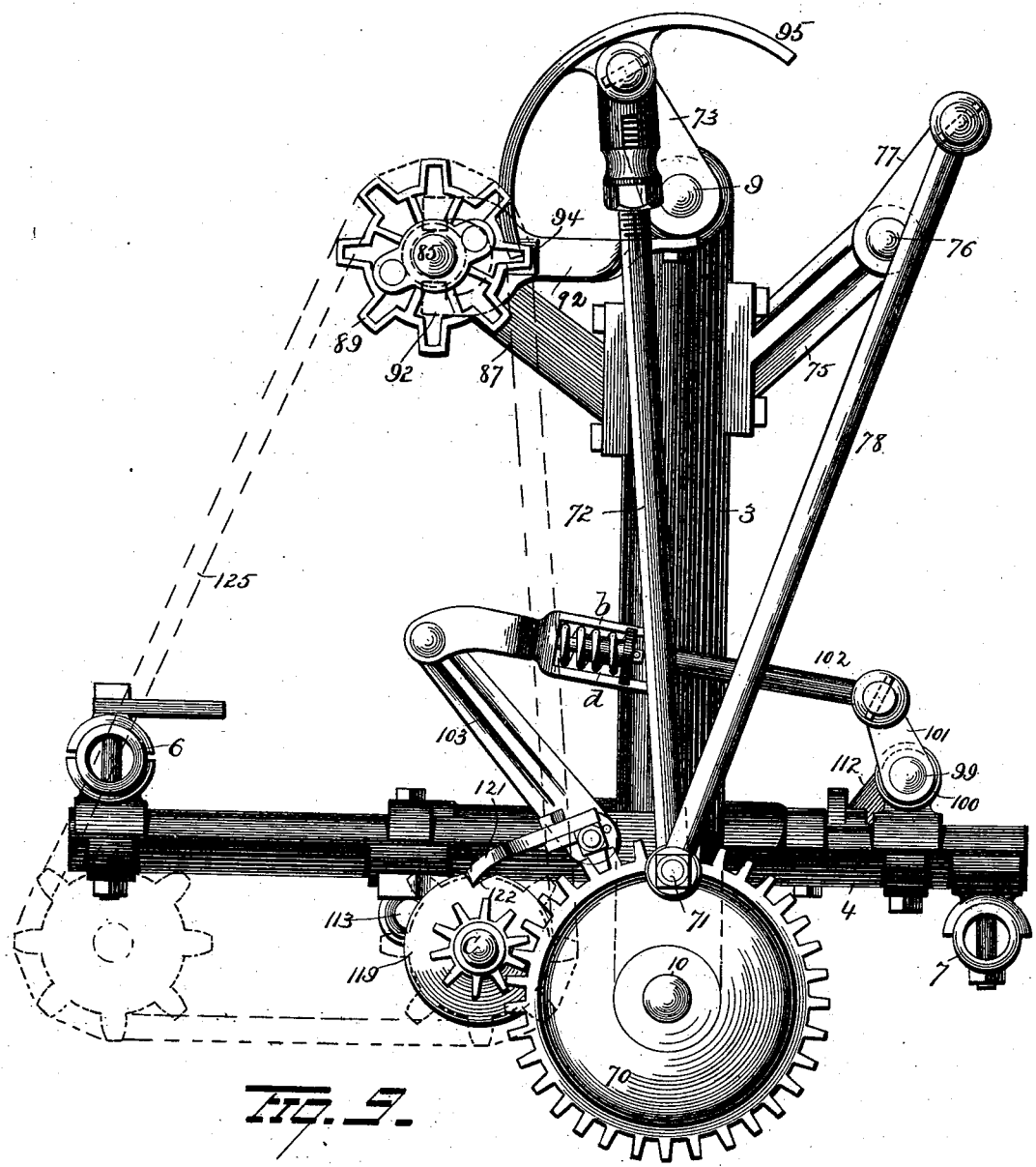

(No Model.)
J. P. MONROE.
SELF BINDING HARVESTER.
No. 506,711.
9 Sheets—Sheet 9.
Patented Oct. 17, 1893.
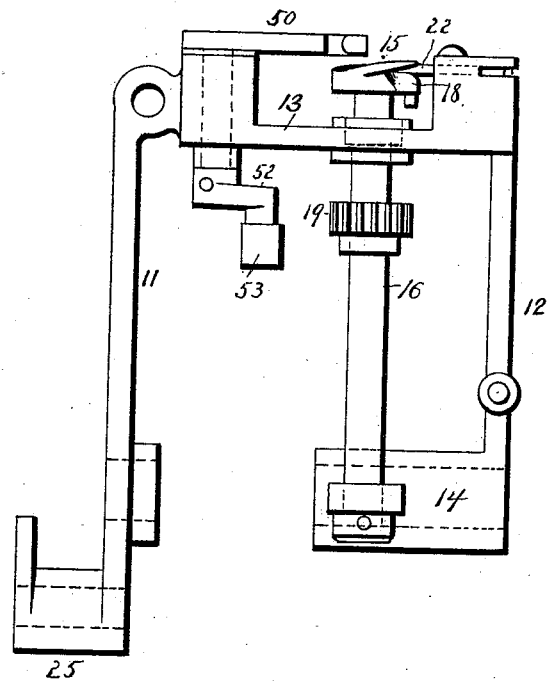
_Fig.13_
Witnesses
E. Nottingham
H. B. Armes.
Inventor
J. P. Monroe
By H. A. Seymour.
Attorney

UNITED STATES PATENT OFFICE.

JOHN P. MONROE, OF RINGGOLD, TENNESSEE.

SELF-BINDING HARVESTER.

SPECIFICATION forming part of Letters Patent No. 506,711, dated October 17, 1893.

Application filed June 23, 1891. Serial No. 397,206. (No model.)

*To all whom it may concern:*

Be it known that I, JOHN P. MONROE, of Ringgold, in the county of Montgomery and State of Tennessee, have invented certain new and useful Improvements in Self-Binding Harvesters; and I do hereby declare the following to be a full, clear, and exact description of the invention, such as will enable others skilled in the art to which it appertains to make and use the same.

My invention relates to an improvement in self binding harvesters, it having to do more particularly with the binding mechanism which comprises the packing, binding, knotting and discharging apparatus and is an improvement upon the invention for which Letters Patent No. 429,465 were granted to me June 3, 1890, and the object is to reduce and simplify parts, thereby lessening the friction and complexity and greatly reducing the weight and size of the machine.

With this object in view my invention consists in certain novel features of construction and combinations of parts as will be hereinafter described and pointed out in the claims.

In the accompanying drawings, Figure 1 is a plan view with packers and deck removed. Fig. 2 is a view on line *a—a* of Fig. 1. Fig. 3 is a view on line *b—b* of Fig. 1. Fig. 4 is a section on line *c—c* of Fig. 1. Fig. 5 is a section on line *d—d* of Fig. 1. Fig. 6 is a view on line *e—e* of Fig. 1. Fig. 7 is a view on line *x—x* of Fig. 1. Fig. 8 is a view on line *y—y* of Fig. 1. Fig. 9 is a rear elevation. Figs. 10, 11, and 12 are details; and Fig. 13 is a detached view of the knotter frame.

A represents the main frame of the binder around which the other parts are arranged in convenient positions. This frame preferably consists of solid iron or piping bent into U-shape to form the upper and lower parallel arms 1 and 2 and the connecting brace 3. The frame also consists in a pair of bars 4 and 5 also of piping if desired secured respectively to one side of the brace 3 and at or near the outer end of arm 2, and it still further consists of the bars 6 and 7 secured respectively to the upper and under sides of bars 4 and 5 by suitable couplings 8, 8, or equivalent means. The arms 1 and 2 being hollow furnish bearings for a pair of shafts 9 and 10 respectively and to the opposite ends of these shafts the essential operating parts are connected. These parts will now be described and first the knotting mechanism which is connected with the forward end of the shaft 10. A rectangular yoke, consisting of two uprights 11 and 12 and connecting bar 13, is secured to the forward end of the arm 2 and connected by bracket 13ª to bar 5. The inner upright 11 is preferably integral with arm 2 or secured rigidly thereto and the other upright 12 is provided with an inwardly projecting bearing sleeve 14 which receives and forms a bearing for the outer end of the shaft 10.

The numeral 15 represents the knotter and 16 is the spindle or shank upon the upper end of which the knotter is secured. This knotter does not differ materially from the one described in my former patent above referred to and therefore a detailed description is unnecessary here. It may be briefly stated however that it consists of a single piece of metal journaled in connecting bar 13 and is furnished with the rigid knotting bills 17 and 18 which perform the operation of tying the knot. The mode of operating this knotter differs somewhat from my former invention and will now be described. A small pinion 19 is secured to the knotter spindle a short distance beneath the bar 13. Sliding rack bar 20 is guided in a box 21 and the latter extends grainward from the yoke and is connected at its grainward end by an arm 21ª to the bar 5. The teeth of this rack bar are intermeshed with the teeth of the pinion so that as the bar reciprocates the knotter is rotated forward about one and a quarter turns and then reversed during which time the knot remover 22 operates to push the completed knot from the bills. The rack bar has connected therewith a pitman 23 by means of which the rack is reciprocated. The opposite end of the pitman is pivotally connected with one end of a lever 24 and the latter is pivotally supported at its opposite end on a projection 25 depending from the outer end of arm 2. A cam wheel 26 is secured on the shaft 10 between the upright 11 and the bearing sleeve 14. This cam wheel is provided with several cams each being adapted for a special purpose. The cam 27 on the side of the wheel adjacent to the lever 24 co-operates with an anti-friction roller 28 on the lever 24 and vibrates the latter intermittingly at predetermined periods to reciprocate the pitman 23 and rack bar 20. The hub 30 of the cam wheel constitutes the neutral portion of this cam and while this portion is traveling in contact with the hub the rack and consequently the knotter remains stationary but while traveling in contact with the pointed portion or the cam proper the lever 24 is swung back and forth once and the bar and knotter are operated.

Co-operating with the knotter, is a twine holder 31 which will now be described. A barrel 32 is secured preferably to the inner side of the sleeve 14. Fitted within this barrel is a sliding sleeve 33 and inside of this sleeve is a rod 34. The latter carries at its upper end the two spur wheels or disks 35 which are designed to catch the twine and wedge it between the crescent shaped clamping jaws 36, 36, secured on the upper end of the sleeve 33 the disks and rod being held downward by a spiral spring 35$^a$. The object of the sleeve 33 sliding is simply to give slack to the twine while the knots are being tied and the movement of this sleeve is regulated to the amount of slack required in the formation of the knot. The operation of roller 39 against cam 38, on main cam wheel 26, allows the sleeve to rise toward the knotter just fast enough to give cord to it. Cam 38 pushes the sleeve down to its place and holds it there (after the twine is cut off) until the next knot is formed. The knotter in its operation draws the sleeve to it. The cam 38 prevents it moving faster than is required. The drawing of the cord is performed by the knotter and cam 38 controls the movement of the cord holder. The cord holder is lowered again at the required interval and is held down by the cam 38 on the main cam wheel 26 until more slack is required for tying another knot. The arm 40 upon which the roller is mounted projects laterally and is prevented from swinging laterally by its contact with a standard 41 projecting upward from sleeve 14.

The cord holder is turned in the following manner at the desired intervals: At the lower end of the barrel 32 an angular plate 42 is revolubly supported. This plate is preferably square but its shape may be varied to correspond to the number of spurs on the spur disk of the cord holder. Generally four of these spurs are sufficient. The edges of this angular plate bear on the edge 43 of the main cam wheel 26 and thus the plate is prevented from turning except at the required intervals. But the turning of one notch is effected by a pin 44 on the main cam wheel striking one of the pins 48$^a$ on the angular plate once during each revolution of the main cam wheel 26. In order to admit of this turning the cam edge 43 of the cam wheel is furnished with a notch 45 which receives a corner of the angular plate as the latter is turned. In order that the cord holder may turn with the angular plate and at the same time be free to slide as above described the rod 34 of the holder is provided with the usual groove 46 and the plate has a corresponding feather 47 which enters the groove 46 and thus admits of a sliding movement.

Other accessories besides the knotter and cord holder are necessary in order to guide the cord, sever it and the like and these will now be described.

A tucker 50 is supported in a box 51 on top of the connecting bar 13. This tucker is arranged to swing over the knotter and carry the cord in position to be operated upon in the tying of the knot. This tucker is provided with an arm 52 at its lower end and on this arm is mounted an anti-friction roller 53 which follows the cam 54 on the edge of the main cam wheel 26 and by means of which it is operated. This cam is divided into two parts, one being for the purpose of swinging the tucker positively in one direction and the other to swing it positively in the opposite direction to get it out of the way when it has done its work. Also a twine guiding hook 55 is provided. This hook is pivoted at one end to the upper end of upright 11 and its free end is in proximity to the knotter the object of this guiding hook being to change the horizontal plane of the cord in order to direct its position relative to the tying bills of the knotter in the formation of the knot. This hook is provided with a roller adapted to travel on a small peripheral cam 56 on the main cam wheel 26. The formation of this peripheral cam is such that the hook is raised to the proper height at the precise period required for the knotter to receive it and hold it in place. In passing into the knotter the cord enters between a pair of guide jaws 58, 58. These jaws are formed on the inner edge of the connecting bar 13 and preferably beneath these jaws, the blades 59 and 60 of the shears are located. The blade 59 is rigid and blade 60 is pivoted. The latter is operated at predetermined intervals by the lever 61. The latter is fulcrumed on the outer edge of the upright 12 at or near its middle and its upper end is connected with the shank of the pivoted shear blade 60 by a link and the ball and socket joints 62, 62 as shown. The opposite end of the lever 61 is provided with an anti-friction roller 63 and the latter operates in the cam hub 64 on the extreme forward end of the shaft 10.

The operation of these parts may be briefly described as follows: The twine is carried down by the needle to a point a trifle below the cord holder. The needle remains in this position a moment during which period the pin 44 strikes one of the pins 48$^a$ on the angular plate and causes the latter with the cord holder to make a quarter turn thus taking hold of the cord and holding it securely. While the cord has been carried down to this holder, the tucker 50 has swung over the knotter to draw the cord into position. When in this position the knotter begins to turn and after it has turned part way around the cord guiding hook raises the cord over the projection $a$ on the side of the knotter where it holds the cords until the bills of the knotter have caught it between them. As soon as this is done the hook drops out of the way. Meanwhile the knotter continues to turn until it has made about one and a quarter revolutions, when it reverses. During the latter motion the loop is pushed off of the knotter and over the loop which the projection on the lower bill forms and in this way the knot is tied. As soon as this is done the cord is cut beneath the knotter and the gavel is secure. The tucker then swings back and the cord holder which has raised to furnish slack for the knot is forced down and the parts are in position for a repetition of the operation.

The needle 65 which carries the twine to the knotter consists of a straight bar of metal which, is arranged to have a positive endwise movement and it passes through guides 66, 66, formed on the forward end of the arm 1. This needle is reciprocated by a crank 67 on the forward end of shaft 9 and this crank is connected to the upper end of the needle by the pitman 68. In this connection attention will be directed to the mechanism for operating the needle and as this mechanism is intimately associated and dependent upon the apparatus which actuates the knotting, cutting, and other parts they will all be described together. On the rear end of shaft 10 a gear wheel 70 is secured and from a wrist pin 71 projecting from this wheel, a pitman 72 extends to a crank 73 on the rear end of shaft 9 and through the medium of this pitman, the latter is rocked and the needle at the opposite end of the shaft is reciprocated. Alongside the rocking shaft 9 and supported by bracket arms 75, 75, is a rocking shaft 76. This shaft has on its rear end a crank 77 which is connected by pitman 78 to the same wrist pin 71 to which pitman 72 is connected. This rocking shaft 76 is located on the outer side of the frame and carries the discharge arms 80, 80 which remove the gavel from the machine as soon as it is formed. These discharge arms are formed in two parts and the joint formed between them is such that the outer ends of the arms yield as they pass backward over the gavel and are rigid like a knife blade when swung in the opposite direction. These hinged sections of the discharge arms are preferably curved on their outer edges and pointed at the extreme ends to facilitate their entrance into or back of the straw and the moment the pressure upon them is outward the arms become straight and rigid and remain so until they have accomplished their work of discharging the bundle. Then as they return for the next bundle they fold and drag over the straw. If desired a small spring may be employed to throw these hinged sections outward but such springs may be employed or not as desired or as found most practicable.

The grain as it passes in between the deck and the breast plate 83 is fed forward by a set of packers 84, 84, and these are pivotally connected to the cranks on the crank shaft 85 their stems passing loosely through guides 86, 86, on the main frame. This crank shaft 85 is revolubly supported in bracket arms 87, 87 extending inward from the main frame. A sprocket wheel 89 is loosely mounted on this shaft and by means of it the shaft is driven but it is essential that the packers should stop while the tying takes place and to insure this intermittent motion, the clutch 90 is provided. One cheek of the latter is formed on the hub of the sprocket wheel and the other is arranged to slide on the shaft, a feather or spline being employed to prevent its turning but to admit of its sliding back and forth. This sliding cheek is normally held in engagement with the cheek on the hub of the sprocket wheel by a stiff spiral spring 91. A simple means for shifting the slide cheek consists of a shipper 92 which is pivoted at one end to the main frame and operates at its opposite end in a circumferential groove 93 in the cheek. On this shipper is formed a cam block 94 and a crescent cam 95 on the crank 73 is adapted to operate in connection with this cam block 94 and by its contact therewith it disengages the clutch cheek and stops the packers until the bundle is finished.

The entire binding apparatus is set in motion by the straw pressing against the compressor arm 98 and forcing the latter outward. This arm is adjustably set on the rocking shaft 99 in a position approximately in line with the needle or at any rate at a point as near as possible opposite the center of the bundle. The shaft 99 is supported in suitable boxes 100, 100, on the bars 4 and 5 of the main frame. This shaft is provided at its rear end with a small crank 101. This crank is pivotally connected with the pitman 102 and the latter in turn is connected at its opposite end to one end of a lever 103. In this connection attention should be directed to the fact that the pitman 102 consists in two parts and is extensible. It is for convenience constructed as shown. One section is provided with a yoke $b$ and through the outer end of this yoke the stem of the other section passes loosely. On the end of this stem a guide disk $c$ is loosely mounted and this disk is notched at its opposite edge to receive the parallel edges of the yoke. A stout spiral spring $d$ is mounted on this stem between the disk and end of the yoke. The object of this extensible pitman is to allow the compressor arm 98 to yield as the straw crowds against it notwithstanding that the lever 103 which connects it may not be in condition to swing. This lever is fulcrumed on the side of the connecting brace 3 and at its free end is provided with an anti-friction roller 106 which operates in connection with a cam 107 on the inside of the gear wheel 70, the object of said cam being to force the arm 98 inward together with the loop 107ª to compress the gavel while it is being bound. So it is not until when the bundle has been completed that the roller 106 becomes disengaged from the cam 107 that the compressor arm may be pushed aside to allow the bundle to pass out of the machine.

To return now to the statement previously made, to wit, that the entire binding apparatus is set in motion by the straw impinging against the compressor arm 98 explanation will in this connection be made of the manner of accomplishing this. A small rock shaft 110 is supported in position on the main frame so that its outer end comes in close proximity to the shaft 99 and the shaft is provided at its outer end with a cam 111 adapted to be struck by an arm 112 on shaft 99. The opposite end of this shaft 110 has connected therewith a sliding stop 113 which performs the entire work of stopping the binding apparatus while straw is being collected for a new bundle. This stop tends to move outward or rearward normally but a small slide rod 114 having an anti-friction roller 115 on one end and connected with the rock shaft 110 at the outer end is so arranged that the roller travels on the rim of wheel 70 and when in this contact the stop is held inward but the cam rim of the gear wheel 70 has a notch 116 formed therein for this roller 115 to drop into in order to allow the stop to slide outward to stop the operation of the binding apparatus. This is done in the following manner: The drive shaft C has a ratchet toothed wheel 118 secured thereon and also a flanged pinion 119 loosely mounted thereon. The pinion is meshed with gear wheel 70 and communicates motion thereto when it is itself in motion and it is locked or unlocked by a pawl 120. The latter is pivoted to the flange on the pinion and is adapted to normally engage the teeth of the ratchet wheel, a small spiral spring being provided for this purpose. The free end of this pawl projects out in position to strike the stop when the latter is in its normally outward position. When thus struck a drop pawl 121 pivoted in position drops into a notch 122 in the flange of the pinion 119 and prevents the pinion from turning backward and thus locks the parts. The parts are again unlocked as previously described by the straw crowding against the compressor arm sufficiently to rock shaft 99 and thus the shaft 110 to withdraw the stop.

Motion is preferably given to the apparatus by an endless chain 125 which passes around a sprocket wheel on a shaft on the binder, one on the shaft C and the one on the packer shaft as shown.

In operation the grain is fed into the binder in the usual way between the deck and breast plate until enough has accumulated to force arm 98 outward. This sets the parts in motion as previously explained. The needle carries the cord to the cord holder and the knot is formed as described and the bundle is ejected, the parts being in readiness for the next bundle.

Having fully described my invention, what I claim as new, and desire to secure by Letters Patent, is—

1. The combination with a cord knotter, of a cord holder consisting of a pair of crescent shaped clamps slightly separated, a sleeve upon which the clamps are secured, a rod passing through the sleeve and adapted to turn therein, and a pair of spur wheels secured on this rod, one above the clamps and one between them, substantially as set forth.

2. The combination with a knotter, and means for operating the latter, of a cord holder consisting of a sliding sleeve having clamps thereon, a spur wheel, and a stem upon which the spur wheel is carried, substantially as set forth.

3. The combination with a cord knotter comprising a stem having a knotter disk thereon and a pinion thereon, and a reciprocating rack for operating the knotter, of a cord holder consisting of a sliding sleeve having clamps thereon, a spur wheel, and a stem upon which the spur wheel is carried, substantially as set forth.

4. The combination with a knotter of a rigid barrel, a sleeve constructed to slide therein, said sleeve having clamps formed thereon, a cord holder constructed to move with the sleeve and having a stem which passes loosely through the sleeve and means for rotating the cord holder, substantially as set forth.

5. A cord holder consisting of a sliding sleeve having clamps thereon, a spur wheel, and a stem upon which the spur wheel is carried adapted to turn in the sleeve, substantially as set forth.

6. The combination with a barrel, and a sliding sleeve having clamps thereon, of a stem having a spur wheel thereon, the stem having a feather or groove, and an angular plate or disk with which the stem has sliding connection, and a wheel for turning the plate or disk at required intervals and for preventing its rotation at other intervals, substantially as set forth.

7. The combination with a barrel, a sliding sleeve having clamps thereon, and a rotary stem having spur wheel thereon, of an angular plate having projections thereon, and a wheel constructed to bear on the edges of this plate and provided with a projection adapted to strike projections on the plate whereby the latter is turned at intervals, substantially as set forth.

8. The combination with a rotary cord knotter, of a cord holder comprising a fixed barrel, a sleeve adapted to slide therein, said sleeve having clamping jaws formed thereon, a stem revolubly supported in the sleeve and provided with spur wheel, and a cam adapted to control the sliding motions of the sleeve, substantially as set forth.

9. The combination with a knotter, of a cord holder comprising a barrel, a sliding sleeve therein, clamping jaws on the sleeve, spur wheel, a stem on which the latter is carried, an angular plate with which the stem has sliding connection, and a cam wheel constructed to periodically turn the angular plate and to control the sliding movements of the sleeve, substantially as set forth.

10. The combination with a barrel, a sliding sleeve having clamps thereon, an arm thereon carrying an anti-friction roller, a spur wheel, and a stem supporting the latter, of a cam wheel for operating with the roller, and a standard against which the arm on the sleeve travels, substantially as set forth.

11. The combination with packers for forcing the grain forward to the knotter mechanism, of a compressor arm, a rock shaft upon which this arm is secured, a gear wheel having a rim therein with a notch formed in it, a rock shaft having an arm thereon adapted to be struck by a cam or arm on the compressor shaft, a slide dog connected with this rock shaft, a slide rod also connected with the rock shaft, said rod having a roller on its free end adapted to bear on the rim of the gear wheel and drop into the notch therein once during each revolution of the wheel, a drive shaft having a loosely mounted pinion the teeth of which engage the teeth of the gear wheel, a ratchet toothed wheel secured on the drive shaft and a pawl pivoted to the pinion and adapted to engage the teeth of the ratchet toothed wheel, said pawl adapted to be controlled by the dog, substantially as set forth.

12. The combination with a knotter, and a sliding cord holder comprising a sliding sleeve having clamps thereon, a spur wheel and a stem carrying the spur wheel, of a needle for carrying cord to the holder, substantially as set forth.

13. The combination with three shafts lying approximately parallel with one another, one having ejectors thereon, one having a needle connected therewith and the third having cams for operating the knotting mechanism, of a pair of pitmen extending from the same center on the cam shaft to the other two shafts whereby motion from one is communicated to the other two shafts, substantially as set forth.

14. The combination with four shafts approximately parallel with one another, one having packers thereon, another having ejectors, a third provided with cams for operating the knotter mechanism, and a fourth having a needle connected therewith, of a gear wheel on the cam shaft, pitmen extending from this gear wheel to cranks on the needle and ejector shafts, a drive shaft having a gear wheel intermeshed with the gear wheel on the cam shaft, and means for communicating motion from the drive shaft to the packer shaft, substantially as set forth.

15. The combination with a compressor arm and a rocking shaft for supporting the latter, of a rocking shaft extending approximately at right angles to the compressor arm shaft, said rock shafts having cam projections thereon adapted to engage each other whereby the latter shaft is rocked by the compressor carrying shaft, gear wheels 70 and 119 intermeshed with each other, a pawl connected with the latter for locking it to its supporting shaft, a sliding stop, connected with shaft 110, and a slide rod connected with shaft 110 and adapted to bear on wheel 70 to prevent the shaft from rocking, substantially as set forth.

In testimony whereof I have signed this specification in the presence of two subscribing witnesses.

J. P. MONROE.

Witnesses:
  H. P. GHOLSON,
  J. M. ROGERS.